United States Patent
Karas et al.

(10) Patent No.: US 10,363,510 B1
(45) Date of Patent: Jul. 30, 2019

(54) CLIMATE CONTROL FILTER MONITORING SYSTEM AND METHOD OF MONITORING THE USEFUL LIFE OF A CLIMATE CONTROL SYSTEM FILTER

(71) Applicant: FORD GLOBAL TECHNOLOGIES, LLC, Dearborn, MI (US)

(72) Inventors: Lawrence C. Karas, New Boston, MI (US); Upendra J. Patel, Canton, MI (US); Volker Scheer, Roetgen (DE); Clay Wesley Maranville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/996,233

(22) Filed: Jun. 1, 2018

(51) Int. Cl.
*B01D 46/00* (2006.01)
*F24F 11/49* (2018.01)
*B01D 46/44* (2006.01)
*B60H 3/06* (2006.01)

(52) U.S. Cl.
CPC ....... *B01D 46/0086* (2013.01); *B01D 46/446* (2013.01); *B60H 3/0658* (2013.01); *F24F 11/49* (2018.01); *B01D 2279/40* (2013.01); *B60H 2003/0683* (2013.01)

(58) Field of Classification Search
CPC .. B01D 46/0086; B01D 46/446; B01D 46/42; B01D 35/143; B60H 3/0658; F24F 11/49; G01N 15/08; G08B 21/00; B60Q 1/00
USPC ...... 340/606, 607, 611, 457.4; 73/38; 95/25; 210/741, 742; 700/275, 276
See application file for complete search history.

(56) References Cited

U.S. PATENT DOCUMENTS

| | | | |
|---|---|---|---|
| 3,071,914 A | 1/1963 | Jorgen et al. | |
| 3,478,601 A * | 11/1969 | Niebergall | G01N 15/0272 73/38 |
| 3,934,543 A | 1/1976 | Howard | |
| 4,050,291 A | 9/1977 | Nelson | |
| 5,315,838 A | 5/1994 | Thompson | |
| 5,606,311 A * | 2/1997 | Polidan | B01D 46/0086 340/607 |
| 6,334,959 B1 | 1/2002 | Sutton et al. | |
| 6,993,414 B2 | 1/2006 | Shah | |
| 7,594,960 B2 | 9/2009 | Johansson | |
| 2003/0226809 A1 | 12/2003 | Zagone et al. | |
| 2011/0054811 A1* | 3/2011 | Contini | B01D 35/143 702/47 |

(Continued)

FOREIGN PATENT DOCUMENTS

| | | |
|---|---|---|
| CN | 106403086 A | 2/2017 |
| DE | 102006055603 A1 | 6/2007 |
| EP | 1285686 A1 | 2/2003 |

(Continued)

OTHER PUBLICATIONS

English Machine Translation of CN106403086A.

(Continued)

*Primary Examiner* — Hung T Nguyen
(74) *Attorney, Agent, or Firm* — Vichit Chea; King & Schickli, PLLC

(57) ABSTRACT

A climate control filter monitoring system includes a control module adapted to periodically set a climate control system to a filter test configuration, test the filter and then indicate when the climate control system filter needs changing or cleaning.

20 Claims, 2 Drawing Sheets

(56) References Cited

U.S. PATENT DOCUMENTS

2011/0185895 A1    8/2011  Freen

FOREIGN PATENT DOCUMENTS

EP            214038  B1    11/2010
JP        H10618402  A      1/1994

OTHER PUBLICATIONS

English Machine Translation of DE102006055603A1.
English Machine Translation of EP1285686A1.
English Machine Translation of EP214038B1.
English Machine Translation of JPH0618402A.

* cited by examiner

CLIMATE CONTROL FILTER MONITORING SYSTEM AND METHOD OF MONITORING THE USEFUL LIFE OF A CLIMATE CONTROL SYSTEM FILTER

TECHNICAL FIELD

This document relates generally to the motor vehicle equipment field and, more particularly, to a climate control filter monitoring system as well as to a related method of monitoring the useful life of a climate control system filter.

BACKGROUND

It is known in the art to provide a climate control system of a motor vehicle with a filter adapted to remove certain particulates and contaminates from the air stream being directed by the climate control system into the passenger compartment of the motor vehicle.

This document relates to a new and improved climate control filter monitoring system as well as to a related method of monitoring the useful service life of a climate control system filter. The system and method provide for testing the operating condition of the climate control system filter on a periodic basis. This is done by setting all operating conditions of the climate control system to a certain test configuration before measuring the pressure drop across the climate control system filter.

More particularly, as the climate control system filter ages, it loads up with contaminates including particulates and chemical contaminates and as a result the pressure drop increases. That pressure drop increase can be directly correlated to a useful filter life condition. As part of the system development, a clean filter can be measured. That filter could then be loaded to a known (dirty) condition and the pressure drop remeasured. The corresponding pressure drop could be used by the climate control filter monitoring system as the trigger point to indicate a dirty filter condition wherein the filter needs cleaning or replacing.

SUMMARY

In accordance with the purposes and benefits described herein, a climate control filter monitoring system is provided. That climate control filter monitoring system comprises a control module adapted to periodically set a climate control system to a filter test configuration and indicate when the climate control system filter needs changing or cleaning. The control module may be further configured to monitor differential air pressure in the climate control system upstream and downstream from the climate control system filter. Further, the control module may include a controller and a differential pressure monitoring device, including a first air pressure sensor upstream from the climate control system filter and a second air pressure sensor downstream from the climate control system filter.

In addition, the control module may be adapted to displace at least one airflow control door of the climate control system into a particular position required by the filter test configuration. Further, the control module may be adapted to set a blower motor of the climate control system to a particular speed required by the filter test configuration. Still further, the climate control module may include at least one actuator to displace the at least one airflow door into the particular position in response to the controller.

Still further, the control module may include an indicator to indicate when the climate control filter needs changing or cleaning. That indicator may be selected from a group of indicators consisting of a visual signalling device, an audio signalling device, a vehicle display, a smart phone, a human interface or combinations thereof. In effect, substantially any device capable of indicating the need to change or clean a filter (soon or now) may be utilized.

Still further, the controller may be configured to receive and respond to data provided by a monitoring device capable of providing data useful for the operation of the climate control filter monitoring system and the associated method of monitoring the useful life of a climate control system filter. Such a monitoring device may be selected from a group of monitoring devices consisting of an ambient temperature monitoring device, a cabin temperature monitoring device, a battery charge state monitoring device, a cabin occupancy monitoring device, a timer, a door position sensor, a sunroof position sensor, a GPS geo locating device, an ignition state monitoring device, an odometer monitoring device, a sun load monitoring device, a vehicle speed monitoring device and combinations thereof.

In accordance with an additional aspect, a new and improved method is provided of monitoring the useful life of a climate control system filter. That method may be broadly described as comprising the steps of: (a) periodically setting, by a control module, a climate control system to a filter test configuration, (b) testing, by the control module, the useful life of the climate control system filter and (c) indicating, by an indicator, when the climate control system filter needs changing or cleaning.

The method may further include the step of monitoring, by the control module, the differential air pressure in the climate control system upstream and downstream from the climate control system filter. Further, the method may include the step of determining, by the control module, frequency of the testing based upon date data. Additionally or alternatively, the method may include the step of determining, by the control module, frequency of testing based upon climate control system use data. Additionally or alternatively, the method may include the step of determining, by the control module, the frequency of testing based upon GPS geo locator data indicating the location of the motor vehicle incorporating the climate control system filter. Additionally or alternatively, the method may include the step of determining, by the control module, the frequency of testing based upon odometer data indicating distance traveled by the motor vehicle incorporating the climate control system filter.

The method may include the step of executing the testing only after determining, by the control module, that the motor vehicle incorporating the climate control system filter is unoccupied: that is, the passenger compartment of the motor vehicle is free of occupants. Additionally or alternatively, the method may include the step of executing the testing only after determining, by the control module, that the battery of the motor vehicle incorporating the climate control system filter has a charge greater than a predetermined value. This is done to ensure the battery of the motor vehicle maintains the necessary charge to allow for subsequently starting the motor of the motor vehicle.

Optionally, the method may include the step of executing the testing only after determining, by the control module, that an ignition state of the motor vehicle incorporating the climate control system filter is OFF. Additionally or alternatively, the method may include the step of executing the testing only after determining, by the control module, that the motor vehicle incorporating the climate control system filter is stationary. Additionally or alternatively, the method may include the step of executing the testing only after determining, by the control module, that all doors and windows of the motor vehicle incorporating the climate control system filter are closed.

In the following description, there are shown and described several preferred embodiments of the climate control filter monitoring system and the related method of monitoring the useful life of a climate control system filter. As it should be realized, the climate control filter monitoring system and related method are capable of other, different embodiments and their several details are capable of modification in various, obvious aspects all without departing from the climate control filter monitoring system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the climate control filter monitoring system and related method and together with the description serve to explain certain principles thereof.

Reference will now be made in detail to the present preferred embodiments of the climate control filter monitoring system and related method of monitoring the useful life of a climate control system filter, examples of which are illustrated in the accompanying drawing figures.

DETAILED DESCRIPTION

Figure 1:
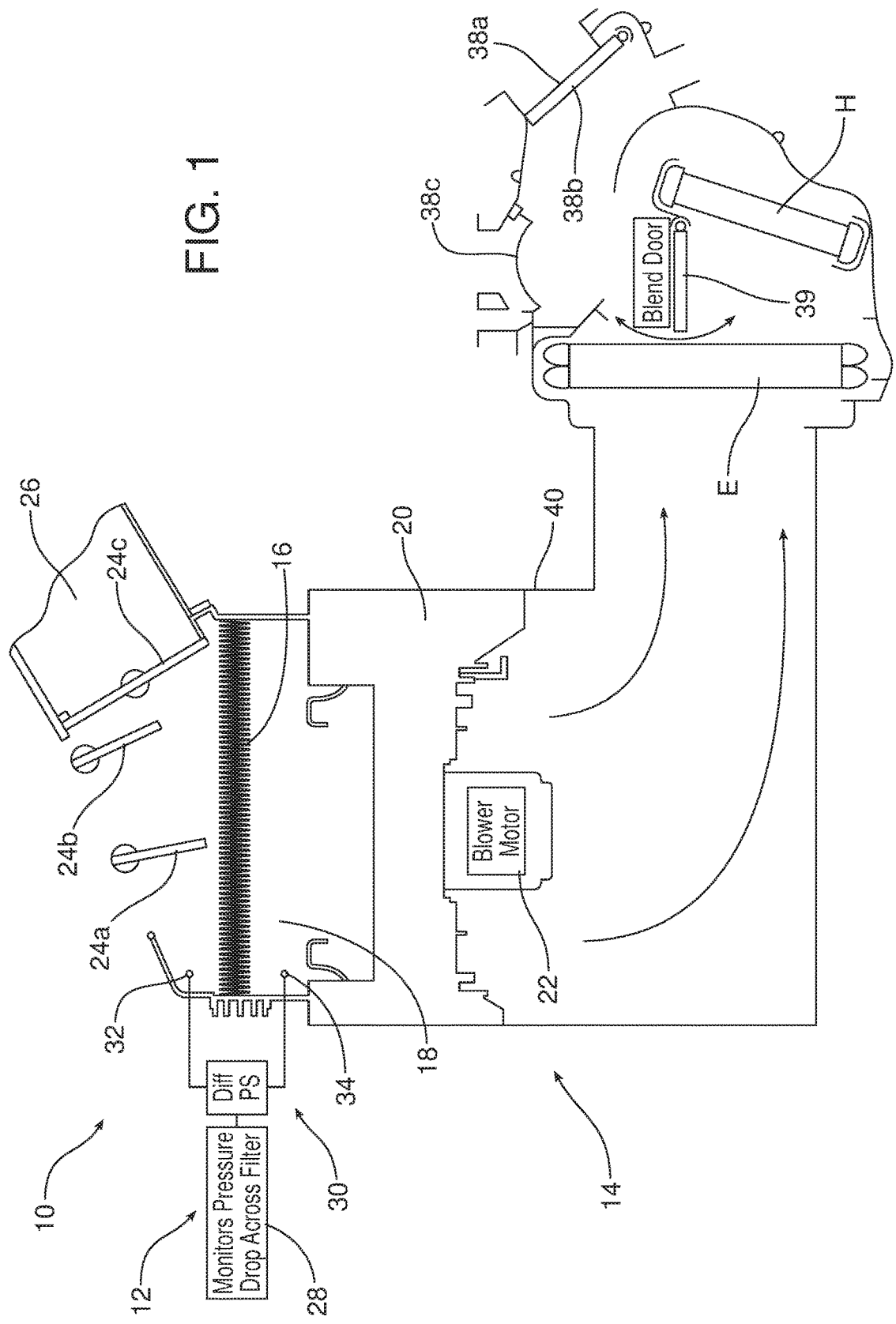
FIG. 1 is a schematic illustration of the heating, ventilating and air conditioning (HVAC) case of the climate control system illustrating the climate control system filter upstream from the blower wheel and blower motor as well as the differential pressure monitoring device of the control module of the climate control filter monitoring system.
Figure 2:
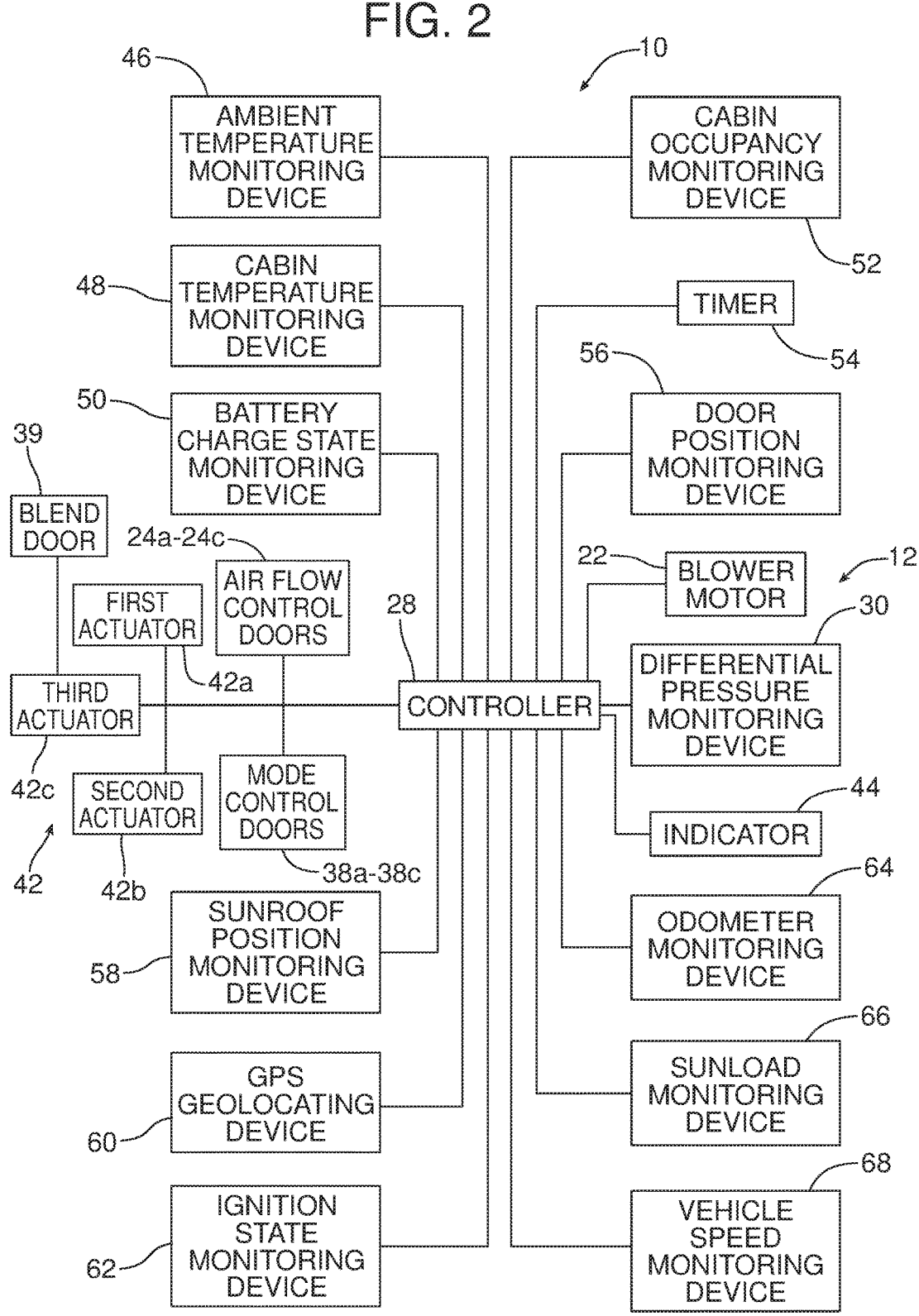
FIG. 2 is a schematic block diagram of the climate control filter monitoring system.

Reference is now made to FIGS. 1 and 2 illustrating the new and improved climate control filter monitoring system 10. That climate control filter monitoring system 10 includes a control module 12 adapted or configured to periodically set a climate control system 14 to a filter test configuration and indicate when the climate control system filter 16 needs changing or cleaning (changing/cleaning). As illustrated in FIG. 1, the climate control system filter 16 extends across the intake manifold 18 of the climate control system 14 (a) upstream from the blower wheel 20 and blower motor 22 that drives the blower wheel and (b) downstream from the plurality of fresh/recirculating air doors 24a-24c that control the intake of air by the climate control system. More particularly, the fresh/recirculating air doors 24a and 24b may be opened to provide for recirculation of air through the passenger compartment of the motor vehicle while airflow control door 24c may be opened to allow for the intake of fresh air into the climate control system 14 through the fresh air inlet duct 26. As illustrated in FIG. 1, the fresh/recirculating air doors 24a-24c are in full recirculation mode with the airflow control door 24c closing off the fresh air inlet duct 26.

The control module 12 includes a controller 28 and a differential pressure monitoring device 30. The controller 28 may take the form of a computing device such as a dedicated microprocessor or an electronic control unit (ECU) operating in accordance with instructions from appropriate control software. Thus, the controller 28 comprises one or more processors, one or more memories, and one or more network interfaces all in communication with each other over a communication bus.

In the illustrated embodiment, the differential pressure monitoring device 30 includes a first air pressure sensor 32 upstream of the climate control system filter 16 in the intake manifold 18 and a second air pressure sensor 34 downstream of the climate control system filter in the intake manifold.

The climate control system 14 further includes operating mode control doors 38a-38c in the heating, ventilating and air conditioning (HVAC) case 40 downstream from the blower wheel 20. In the illustrated embodiment, the first operating mode control door 38a controls airflow to the instrument panel vents (not shown). The second operating mode control door 38b controls airflow to the floor (not shown) of the passenger compartment of the motor vehicle. The third operating mode control door 38c controls airflow to the defroster vents in the instrument panel. As illustrated in FIG. 1, only the second operating mode control door 38b is in the open condition and, therefore, all airflow from the blower wheel 20 is being directed through the HVAC case 40 to the floor of the passenger compartment of the motor vehicle.

Still further, the climate control system 14 includes a temperature blend door 39 for blending warm air from the heater core H with cool air from the evaporator core E and provide conditioned air at a desired temperature.

The control module 12 also includes at least one actuator 42 to displace the various fresh/recirculating air doors 24a-24c, operating mode control doors 38a-38c and the blend door 39 into the desired operating position for the climate control system 14. More particularly, in the illustrated embodiment, the control module includes a first actuator 42, for displacing the fresh/recirculating air doors 24a-24c, a second actuator 422 for displacing the mode control doors 38a-38c and a third actuator 423 for displacing the blend door 39. All of the actuators 42 are connected to and controlled by the controller 28 of the control module 12.

The control module 12 also includes an indicator 44 connected to the controller 28. The indicator 44 functions to indicate when the climate control system filter 16 needs changing/cleaning. The indicator 44 may comprise substantially any type of indicator capable of indicating the need to change or clean the climate control system filter 16. Thus, for example, the indicator 44 may be selected from a group of indicators consisting of a visual signalling device, an audio signalling device, a vehicle display, such as a touchscreen provided on the center stack or a visual display on the instrument panel of the motor vehicle, a smart phone connected to the motor vehicle via a wireless communication network, a human interface of any appropriate type or any combinations thereof.

As illustrated in FIG. 2, the controller 28 of the control module 12 is connected to and configured to receive and respond to data provided by various monitoring devices. In the illustrated embodiment, those monitoring devices are selected from a group of monitoring devices consisting of an ambient temperature monitoring device 46, a cabin temperature monitoring device 48, a battery charge state monitoring device 50, a cabin occupancy monitoring device 52, a timer 54, a door position monitoring device 56, a sunroof position monitoring device 58, a GPS geo locating device 60, an ignition state monitoring device 62, an odometer monitoring device 64, a sun load monitoring device 66 and a vehicle speed monitoring device 68. These various monitoring devices may be of a type known in the art to be useful for monitoring the indicated parameters.

As should be appreciated, the control module 12 of the climate control monitoring system 10 is adapted or configured to periodically set the climate control system 14 to a filter test configuration and also indicate when the climate control system filter 16 needs changing/cleaning.

The filter test configuration is established by a particular positioning of the various fresh/recirculating air doors 24a-24c and operating mode control doors 38a-38c of the climate control system 14 as well as a particular speed setting for the blower motor 22 of the blower wheel 20. In the illustrated embodiment, the filter test configuration consists of setting the fresh/recirculating air doors 24a-24c for full recirculation of air through the passenger compartment and setting the operating mode control doors 38a-38c for directing all discharge of air from the climate control system 14 through the door 38b to the floor of the passenger compartment. The temperature mode is set for full heat. Thus, all operating conditions of the climate control system 14 assume a particular position or configuration when in the filter test configuration in order to ensure consistent filter test conditions.

The method of monitoring the useful life of the climate control system filter 16 will now be described in greater detail. That method comprises the steps of periodically setting, by the control module 12, the climate control system 14 to the predetermined filter test configuration for the climate control system filter 16. This is followed by the step of testing, by the control module 12, the useful life of the climate control system filter 16. That step is then followed by the step of indicating, by the indicator 44 in response to a control signal from the controller 28, when the climate control system filter 16 needs changing or cleaning.

More particularly, the method includes the step of monitoring, by the control module 12 via differential pressure data provided to the controller 28 by the differential pressure monitoring device 30, the differential air pressure in the climate control system 14 upstream and downstream from the climate control system filter 16. This is accomplished by monitoring the air pressure in the climate control system 14 upstream from the climate control system filter 16 with the first air pressure sensor 32, measuring the air pressure in the climate control system 14 downstream from the climate control system filter 16 with the second air pressure sensor 34, determining the difference in the upstream and downstream air pressure and then sending the differential pressure from the differential pressure monitoring device 30 to the control module 12.

In one or more of the many possible embodiments of the climate control monitoring system 10, the method may include the step of determining, by the control module 12, the frequency of testing based upon date data provided to the controller 28 by the timer 54 (e.g. a time and date clock). Additionally or alternatively, the method may include the step of determining, by the control module 12, the frequency of testing based upon climate control system use data provided by the timer 54 indicating the total operating time of the climate control system 14 since the last climate control system filter test was conducted.

Additionally or alternatively, the method may include the step of determining, by the control module 12, frequency of testing based upon GPS geo locator data provided to the controller 28 by the GPS geo locator device 60. That GPS geo locator data indicates the location of the motor vehicle incorporating the climate control system filter 16 to be tested. The location of the motor vehicle is significant as certain areas of the country have spikes in certain pollutants. For example, large industrial cities may have higher levels of air pollution than remote mountain areas. Similarly, some areas of the country have large pollen counts during certain seasons of the year. These environmental factors may be taken into consideration by the control module 12 when determining the frequency of testing of the climate control system filter 16.

Additionally or alternatively, the method may include the step of determining, by the control module 12, the frequency of testing based upon odometer data provided to the controller 28 by the odometer monitoring device 64. Such data indicates the distance travelled by the motor vehicle incorporating the climate control system filter 16. Such data may be relevant to determining the frequency of the testing of the climate control system filter 16.

The method may also include the step of executing the testing only after determining, by the control module 12, when the motor vehicle incorporating the climate control system filter 16 is unoccupied. Data respecting the occupancy of the passenger compartment of the motor vehicle may be provided to the controller 28 by the cabin occupancy monitoring device 52. Such a cabin occupancy monitoring device 52 is known in the art and may comprise, for example, one or more cameras, one or more weight sensing devices in the seats of the motor vehicle, or other known devices for this purpose.

Additionally or alternatively, the method may include the step of executing the testing only after determining, by the control module 12, the battery (not shown) of the motor vehicle incorporating the climate control system filter 16 has a charge greater than a predetermined value. More specifically, this is done by providing battery charge data to the controller 28 from the battery charge state monitoring device 50. More particularly, the predetermined value is the amount of charge determined to be necessary to be held in reserve to turn the starter motor and start the internal combustion engine of the motor vehicle subsequent to testing the climate control system filter 16.

Optionally, the method may include the step of executing the testing only after determining, by the control module 12, that the ignition state of the motor vehicle incorporating the climate control system filter 16 is OFF. Toward this end, the controller 28 is adapted to receive ignition state data from the ignition state monitoring device 62. Here, it should be appreciated that in many possible embodiments of the climate control filter monitoring system, the ignition need not be OFF in order to initiate and complete the filter test.

Additionally or alternatively, the method may include executing the testing only after determining, by the control module 12, that the motor vehicle incorporating the climate control system filter 16 is stationary. Toward this end, the controller 28 is adapted to receive data from the vehicle speed monitoring device 68.

Additionally or alternatively, the method may include the step of executing the testing only after determining, by the control module 12, that all doors and windows of the motor vehicle incorporating the climate control system filter 16 are closed. Toward this end this may be done by configuring the controller 28 to receive door position status data from the door position monitoring device 56. Similarly, the method may include the step of executing the testing only after determining, by the control module 12 that the sunroof of the motor vehicle is closed. This may be done by configuring the controller 28 to receive sunroof position data from the sunroof position monitoring device 58. Since an open window, an open door or an open sunroof could relieve back pressure in the climate control system 14 and alter the air pressure downstream from the climate control system filter 16 thereby skewing differential pressure measurements by the differential pressure monitoring device 30, it is important to confirm that the doors, windows and sunroof of the motor vehicle are all closed as part of the filter test configuration. Similarly, it is important to confirm that the motor vehicle is stationary during testing as movement of the motor vehicle could affect test results.

In some embodiments, the method may also include the step of determining by the control module 12, the frequency of testing based upon sun load as an indication of rainy and overcast weather that might increase the mold count in the air. Toward this end, the controller 28 may be configured to receive data from the sun load monitoring device 66.

The foregoing has been presented for purposes of illustration and description. It is not intended to be exhaustive or to limit the embodiments to the precise form disclosed. Obvious modifications and variations are possible in light of the above teachings. For example, the control module 12 may be configured to detect a missing filter which could cause damage to some climate control systems. The control module 12 could be configured to abort the filter test should an operator change a climate control system setting during the test procedure. All such modifications and variations are within the scope of the appended claims when interpreted in accordance with the breadth to which they are fairly, legally and equitably entitled.

What is claimed:

1. A climate control filter monitoring system of a motor vehicle, comprising:
   a control module having a control software or dedicated microprocessor adapted to periodically set a climate control system to a filter test configuration; and
   an indicator coupled with the control module to indicate when the climate control system filter needs changing/cleaning.

2. The climate control filter monitoring system of claim 1, wherein said control module is configured to monitor differential air pressure in said climate control system upstream and downstream from said climate control system filter.

3. The climate control filter monitoring system of claim 2, wherein said control module includes a controller and a differential pressure monitoring device including a first air pressure sensor upstream from said climate control system filter and a second air pressure sensor downstream from said climate control system filter.

4. The climate control filter monitoring system of claim 3, wherein said control module is adapted to displace at least one air flow control door of said climate control system into a particular position required by said filter test configuration.

5. The climate control filter monitoring system of claim 4, wherein said control module is adapted to set a blower motor of said climate control system to a particular speed required by said filter test configuration.

6. The climate control filter monitoring system of claim 5, wherein said control module further includes at least one actuator to displace said at least one air flow control door into said particular position in response to said controller.

7. The climate control filter monitoring system of claim 6, wherein said control module includes an indicator to indicate when said climate control system filter needs changing/cleaning.

8. The climate control filter monitoring system of claim 7, wherein said indicator is selected from a group of indicators consisting of a visual signaling device, an audio signaling device, a vehicle display, a smart phone, a human interface or combinations thereof.

9. The climate control filter monitoring system of claim 8, wherein said controller is configured to receive and respond to data provided by a monitoring device selected from a group of monitoring devices consisting of an ambient temperature monitoring device, a cabin temperature monitoring device, a battery charge state monitoring device, a cabin occupancy monitoring device, a timer, a door position monitoring device, a sunroof position monitoring device, a GPS geo locating device, an ignition state monitoring device, an odometer monitoring device, a sun load monitoring device, a vehicle speed monitoring device and combinations thereof.

10. A method of monitoring useful life of a climate control system filter of a motor vehicle, comprising:
    periodically setting, by a control module having a control software or a dedicated microprocessor, a climate control system to a filter test configuration;
    testing, by said control module, said useful life of said climate control system filter; and
    indicating, by an indicator, when said climate control system filter needs changing/cleaning.

11. The method of 10, including monitoring, by said control module,
    differential air pressure in said climate control system upstream and downstream from said climate control system filter.

12. The method of claim 11, including determining, by said control module, frequency of testing based upon date data.

13. The method of claim 11, including determining, by said control module, frequency of testing based upon climate control system use data.

14. The method of claim 11, including determining, by said control module, frequency of testing based upon GPS geo locator data indicating location of a motor vehicle incorporating said climate control system filter.

15. The method of claim 11, including determining, by said control module, frequency of testing based upon odometer data indicating distance traveled by a motor vehicle incorporating said climate control system filter.

16. The method of claim 11, executing said testing only after determining, by said control module, a motor vehicle incorporating said climate control system filter is unoccupied.

17. The method of claim 11, executing said testing only after determining, by said control module, a battery of a motor vehicle incorporating said climate control system filter has a charge greater than a predetermined value.

18. The method of claim 11, executing said testing only after determining, by said control module, an ignition state of a motor vehicle incorporating said climate control system filter is OFF.

19. The method of claim 11, executing said testing only after determining, by said control module, a motor vehicle incorporating said climate control system filter is stationary.

20. The method of claim 11, executing said testing only after determining, by said control module, that all doors and windows of a motor vehicle incorporating said climate control system filter are closed.

* * * * *